(12) United States Patent
Tobin et al.

(10) Patent No.: US 7,319,973 B1
(45) Date of Patent: *Jan. 15, 2008

(54) METHOD OF ESTIMATING EXPECTED REVENUES FROM BUSINESS DIRECTORY BOOKS

(75) Inventors: Roger L. Tobin, Arlington, MA (US); Gregory Wayne Cermak, Needham, MA (US)

(73) Assignee: Verizon Laboratories Inc., Waltham, MA (US)

( * ) Notice: Subject to any disclaimer, the term of this patent is extended or adjusted under 35 U.S.C. 154(b) by 7 days.

This patent is subject to a terminal disclaimer.

(21) Appl. No.: 11/319,607

(22) Filed: Dec. 29, 2005

Related U.S. Application Data

(62) Division of application No. 09/798,336, filed on Mar. 2, 2001, now Pat. No. 7,039,598.

(51) Int. Cl.
 *G06F 17/30* (2006.01)
(52) U.S. Cl. .......................... 705/10; 705/14
(58) Field of Classification Search ................. 705/10, 705/14
 See application file for complete search history.

(56) References Cited

U.S. PATENT DOCUMENTS

| | | | |
|---|---|---|---|
| 4,891,712 A | 1/1990 | Spitzer et al. | |
| 5,708,478 A | 1/1998 | Tognazzini | |
| 5,754,938 A | 5/1998 | Herz et al. | |
| 6,044,357 A | 3/2000 | Garg | |
| 6,256,663 B1 | 7/2001 | Davis | |
| 6,460,036 B1* | 10/2002 | Herz | 707/10 |
| 6,463,585 B1 | 10/2002 | Hendricks et al. | |
| 6,470,079 B1 | 10/2002 | Benson | |
| 6,484,204 B1 | 11/2002 | Rabinovich | |
| 6,571,279 B1* | 5/2003 | Herz et al. | 709/217 |
| 6,647,269 B2 | 11/2003 | Hendrey et al. | |
| 6,792,399 B1 | 9/2004 | Phillips et al. | |
| 6,993,326 B2* | 1/2006 | Link et al. | 455/414.1 |

(Continued)

FOREIGN PATENT DOCUMENTS

WO  WO 97/41673  11/1997

(Continued)

OTHER PUBLICATIONS

Datta et al. "Estimating Business Targets." ACM: Proceedings of the 7th ACM SIGKDD International Conference on Knowledge Discovery and Data Mining, pp. 420-425, Aug. 26-29, 2001.*

(Continued)

*Primary Examiner*—Susanna M. Diaz

(57) ABSTRACT

A new system of analyzing advertising revenue derivation is provided that is particularly useful for predicting an amount of revenue that can be expected from advertisements placed in a business directory book having a certain geographic coverage. The system comprises estimating a preference factor of advertisers located in a first geographic area of placing advertisements in other geographic areas. This preference factor, along with other demographic data, is used to calculate a choice probability that advertisers will choose to place an advertisement in one business directory book over other competing books. A total amount of expected revenue for each particular geographic area within a metropolitan area is calculated. Finally, the total amount of expected revenue attributable to a particular business directory book is predicted based on the choice probability and the total amount of expected revenue for each geographic area.

16 Claims, 1 Drawing Sheet

U.S. PATENT DOCUMENTS

| | | | |
|---|---|---|---|
| 2002/0026359 A1* | 2/2002 | Long et al. | 705/14 |
| 2002/0097193 A1* | 7/2002 | Powers | 345/2.3 |
| 2002/0099606 A1* | 7/2002 | Shlagman | 705/14 |
| 2002/0107027 A1* | 8/2002 | O'Neil | 455/456 |
| 2003/0006911 A1* | 1/2003 | Smith et al. | 340/988 |

OTHER PUBLICATIONS

Seale, Jr., James. "Book Review of 'Stochastic Frontier Analysis,'" Journal of Economic Literature, vol. XXXVIII, pp. 936-991, Dec. 2000 (retrieved from JSTOR).*

Howard, Arley Ann. "Cost Analysis of Distribution Channels: An Empirical Determination of the Optimal Channel Strategy." Dissertation presented to the University of Nebraska, pp. 1-172, Aug. 1985.*

Bauer, Paul. "Recent Developments in the Econometric Estimation of Frontiers." Journal of Econometrics, vol. 46, pp. 39-56, 1990.*

DerGurahian, Jean. "MapInfo Looks to Sharpen Its Aim." Times Union, Business section, p. E1, Dec. 24, 2000.*

"Experian and SRC Launch Auto.DemographicsNow.com, Offering Vehicle Make/Model and Demographic Data by any U.S. Geography." PR Newswire, p. 1, Feb. 1, 2001.*

Hammond, Mark. "Kawasaki Covers New Sales Data Terrain." PC Week, p. 79, Sep. 6, 1999.*

Morrall, Katherine. "Mapping Plots Profitable Strategies." Bank Marketing, vol. 27, No. 5, pp. 61-66, May 1995.*

Marshall, Patrick et al. "A New Look at Old Data." InfoWorld, vol. 17, No. 31, pp. 68-91, Jul. 31, 1995.*

"Market Research Online Classifieds Open up Marketing Cycle." Interactive PR & Marketing News, vol. 5, No. 25, Dec. 11, 1998.*

Troy, Steven M. "Usage Data from Yellow Pages is Boost for the Industry." Marketing News, vol. 24, No. 21, p. 17(2), Oct. 15, 1990.*

Zagorsky, Jay L. "Understanding the Economic Factors Affecting Help-Wanted Advertising." Journal of Advertising, vol. 22, No. 3, pp. 75-84, Sep. 1993.*

Andelman, David A. "Counting Up Americans." Management Review, vol. 87, No. 11, pp. 48-50, Dec. 1998.*

Tiffany, Laura. "If the Name FITS . . . (Cluster Marketing)." Entrepreneur, vol. 28, No. 3, p. 106, Mar. 2000.*

NFO Worldwide Introduces NFO AD: Impact. Business Wire, p04061580, Apr. 1998.

Article from Journal of Educational Statistics, Spring 1976, vol. 1, No. 1, pp. 59-67 entitled A Nonparametric Test for the Correspondence Between Two Proximity Matrices.

* cited by examiner

METHOD OF ESTIMATING EXPECTED REVENUES FROM BUSINESS DIRECTORY BOOKS

CROSS-REFERENCE TO RELATED APPLICATIONS

The present application is a Divisional application to U.S. patent application Ser. No. 09/798,336, filed Mar. 2, 2001 now U.S. Pat. No. 7,039,598, the entirety of which is incorporated by reference herein.

FIELD OF THE INVENTION

The present invention relates generally to a system of analyzing advertising publications. More particularly, the invention relates to a system of predicting revenues expected to be derived from a business directory book, commonly known as a yellow pages book, having a particular geographic coverage.

BACKGROUND OF THE INVENTION

Throughout metropolitan areas, multiple business directories, normally published by different publishers and commonly known as "yellow pages" books, compete for the business of the various advertisers in the area. The competing yellow pages books generally have different, but overlapping geographic coverages. In other words, in a given metropolitan area, various yellow pages books are distributed to different, overlapping subsets of the entire metropolitan area. For example, one yellow pages book may be distributed to suburbs A, B, and C, whereas a different yellow pages book may be distributed to suburbs B, C, D, and E. It is common that the various suburbs have different demographic characteristics in terms of business activity, consumer population, aggregate household income, and the like.

Businesses that advertise in yellow pages books tend to choose from the multiple competing yellow pages books, or at least allocate different levels of advertising dollars to the various competing books. Businesses generally desire to be listed in yellow pages books that are distributed to the households that immediately surround it. However, there may be multiple books that meet that criteria, each with a somewhat different coverage. So, businesses tend to either choose one of the books or allocate different levels of advertising dollars among the books covering its area. Furthermore, businesses may desire to place yellow pages advertisements that reach more distant geographic areas within the same general metropolitan area. Similarly, some geographic areas are highly desirable in which to place advertisements, usually because of the particular demographics of that area. As a result, the specific geographic coverage of a yellow pages book (i.e., households to which a book is distributed) is important to the amount of advertising revenue that the book attracts, and thus, the ultimate financial success of that book.

Typically, one of the first steps in setting the scope of a new yellow pages book involves hiring a market research firm to survey the marketplace, provide data and to make predictions relating to the potential derivable advertising revenue and market share of a proposed yellow pages book. The market research process is typically long and expensive, and includes implementing consumer and business surveys that are custom-designed for each metropolitan area. The survey results must be analyzed by market research professionals to provide market share predictions. The entire market research process typically takes several months to complete. Further, because the market research process is specific to each individual metropolitan area, the entire market research process must be started from scratch each time a publisher designs a new book in a different metropolitan area. Even after the market research is complete, providing feedback for books of various coverages requires several steps and is not instantaneous. As a result, the process of analyzing several proposed books of varying coverages to determine which coverage provides the greatest expected advertising revenue can be an arduous one.

Therefore, a need exists for an improved method of predicting expected revenue generation of yellow pages books having certain geographic coverages.

SUMMARY OF THE INVENTION

Embodiments of the present invention relate to a method of analyzing geographic advertising preferences of potential advertisers, wherein a numerical preference factor indicative of a relative preference of the potential advertisers located in a first geographic area of placing advertisements in a second geographic area is determined.

Accordingly, the present invention can be embodied as an improved system of analyzing yellow pages books, and, in particular, predicting expected revenue generation of proposed yellow pages books having certain geographic coverages. For purposes of the invention, a given geographic area, typically a metropolitan area, is conceptually subdivided into several geographic "cells." Each cell has its own set of demographic characteristics, including such things as population, aggregate household income, number of non-manufacturing businesses, total sales of such businesses, etc. The invented system comprises using three predictive mathematical models to predict the total expected advertising revenue from the proposed book based on (i) demographic information of the various cells, and (ii) information about a proposed book and competing books.

First, a "cell preference model" is used to estimate the aggregate preference of advertisers located in one geographic cell to have their yellow pages advertisements reach customers in each of the other cells in the metropolitan area. The output of the cell preferences model, i.e., a cell preference factor, is used in a "book choice model" to estimate the probability of an advertiser located in one cell of advertising in one particular book over the other competing books. Then, cell demographic information is used by a "revenue model" to determine the total advertising revenue that is expected to be derived from each of the geographic cells. Finally, the total expected advertising revenue from each cell is multiplied by the probability that advertisers from various cells will advertise in each of the books. The ultimate result is a predicted total revenue that is expected to be derived from a yellow pages book having a certain coverage in a given metropolitan area.

According to one aspect of the invention, a method analyzing geographic advertising preferences of potential advertisers is provided, comprising the step of determining a numerical preference factor indicative of a relative preference of the potential advertisers located in a first geographic area of placing advertisements in a second geographic area.

According to a second aspect of the invention, a method of predicting advertising revenue derived from a business directory book is provided, comprising the steps of estimating a geographic preference of advertisers located in a first geographic area of placing advertisements in a second geographic area; and determining an expected amount of advertising revenue attributable to the business directory book based on said geographic preference.

According to a third aspect of the invention, a system for evaluating expected revenues derived from business directory books is provided, comprising a cell preference model that determines a value indicative of the preference of advertisers located in a first cell to advertise in a second cell; a book choice model responsive to said advertiser preference that determines a probability that an advertiser located in said first cell will choose to advertise in a business directory book having certain characteristics; and a revenue model that estimates total advertising revenue potentials respectively of said first and second cells.

The invented system is superior to known systems of analyzing proposed yellow pages books in at least the following ways. First, the system of the present invention is transportable between markets. For example, the invented system can be used in Chicago in the same manner that it can be used in Dallas. The only difference between the applications is the input data, i.e., the demographic data and the information about the proposed and competing books. The input data is generally readily available from public information sources, such as census data. Second, the inventive system is readily adaptable to be implemented in software on a computer. As a result, input information regarding the scope of the proposed yellow pages book can be easily changed and the new expected revenue is returned very quickly. Therefore, the invented system can easily be used to analyze several proposed coverages quickly, thus enabling improved revenue optimization. Finally, the invented system eliminates the need to design custom surveys for each new market and spend several months obtaining and analyzing market research data. As a result, the design of new yellow pages books can be performed more quickly and less expensively than known in prior practice.

DETAILED DESCRIPTION OF A PREFERRED EMBODIMENT OF THE INVENTION

Figure 1:
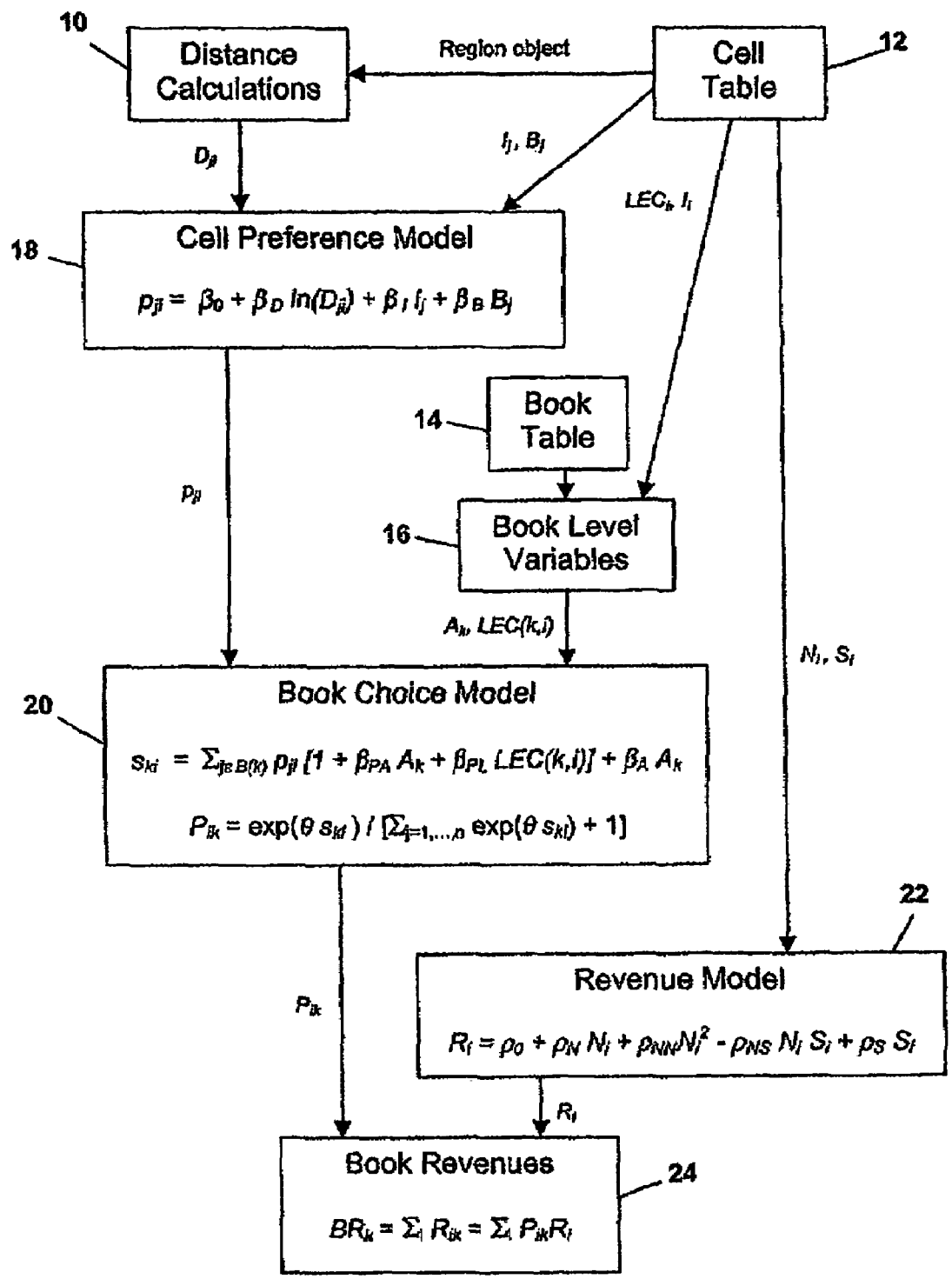
FIG. 1 is a relational flowchart that illustrates a preferred embodiment of the invention, including the relationship between the different predictive models and the input data.

The invented methodology comprises a system for predicting business-advertising activity in various competing business directory books, commonly known as "yellow pages" books. For a given geographic area, the invented system predicts which yellow pages book businesses are likely to advertise in each available yellow pages book as well as predicting the amount of revenue that such businesses will spend advertising in a particular book.

The invented system is premised on the notion that businesses in different metropolitan areas will behave similarly when choosing which among the various competing yellow pages books in their own geographic area to advertise in. For purposes of this system, a given metropolitan area is broken down into a number of geographic "cells". Each cell has its own set of characteristics, including such things as number of households, aggregate household income and the number of non-manufacturing businesses. Commonly, each particular yellow pages book is distributed to a number of geographic cells. The invented system is used to predict the amount of revenue that a yellow pages book will generate in light of the particular geographic cells to which it is distributed.

From a macro perspective, the invented system can be broken down into three different predictive mathematical models that work together to ultimately predict the total amount of revenue that businesses will spend advertising in a given yellow pages book having a particular geographic coverage. With reference to FIG. 1, the invented system includes a "cell preference model" (block 18), a "book choice model" (block 20) and a "revenue model" (block 22). These three models depend on input data received from two basic data tables: (i) a "cell table" 12, and (ii) a "book table" 14. The cell table 12 includes data about each geographic cell, including number of household, aggregate household income, number of non-manufacturing businesses, identity of the local telephone service provider and geographic information (to calculate distance between cells). The book table 14 has data relating to each of the competing yellow pages books, including, for example, data relating to which cells are covered by which books.

The three predictive models will be explained in detail below. However, generally, the cell preference model 18 is used to compute a cell preference factor, $p_{ji}$, which is indicative of the relative preference (p) of a business located in cell i to advertise in cell j. To make this prediction, the cell preference model depends on the physical distance between the cells ($D_{ji}$), the aggregate household income in cell j ($I_j$) and the total sales of the businesses located in cell j ($B_j$). The cell preference factor is used in a book choice model 20.

The book choice model 20 computes a book attractiveness factor, $s_{ki}$, which is indicative of the attractiveness of a given yellow pages book relative to other competing yellow pages books. The book attractiveness factor depends on, among other things, the cell preference factor (from the cell preference model 18), the particular cells covered by the yellow pages book, and the aggregate income of households within the coverage of the book. The book attractiveness factor is used to compute the probability that advertisers in a given cell will advertise in a particular book. Finally, a revenue model 22 predicts the revenue potential of a particular geographic cell. The revenue model depends on input data in accordance with specific factors including, for example, the number of non-manufacturing businesses in the cell and the total sales of non-manufacturing businesses in the cell. Ultimately, the total amount of revenue generation for a given yellow pages book (with a particular geographic scope) is calculated (block 24) based on the choice probability (from the book choice model) and the revenue potential of each covered cell (from the revenue model 22).

Now, the invented system will be described in more detail, with particular attention to each of the predictive models. The cell preference model 18 is designed to explain advertisers' preferences and predict their preferences for advertising in the various geographic cells. The cell preference model 18 computes a cell preference factor ($p_{ij}$) indicative of the preference of advertisers located in cell i to advertise in cell j. The cell preference model 18 is as follows:

$$p_{ji} = \beta_o + \beta_D \ln(D_{ji}) + \beta_I I_j + \beta_B B_j$$

where:

$D_{ji}$ is the distance (in miles) from cell k to cell j;

$I_j$ is the aggregate income (in thousands of dollars) of all households located in cell j;

$B_j$ is the total sales (in millions of dollars) of all businesses located in cell j.

The estimated coefficients may be empirically determined based on survey data using the GLM procedure (generalized least squares regression) contained in the SAS (SAS Institute, Inc.) suite of data analysis procedures. The coefficients are as follows:

| Coefficient | Value |
| --- | --- |
| $\beta_0$ | 1.1933 |
| $\beta_D$ | −0.4035 |
| $\beta_I$ | 1.087E−8 |
| $\beta_B$ | 4.916E−6 |

The input data, D (distance), I (aggregate income) and B (total sales) are read from the cell table 12, which is a database of information related to each geographic cell in the metropolitan area. The aggregate income and total sales data are input directly to the cell preference model. The geographic data for each cell is used to calculate the distance between the various geographic cells, as shown in block 10 (of FIG. 1), prior to being input into the cell preference model.

For each geographic cell in a given metropolitan area, the cell preference model 18 is used to compute multiple cell preference factors, one for each of the other cells in the metropolitan area. For example, if a given metropolitan area is divided into 100 cells, then 100 cell preference factors are calculated for each cell. For cell 1, the 100 cell preference factors ($p_{1,1}$-$p_{1,100}$) would be indicative of the relative preference that advertisers located in cells 1-100 have for advertising in cell 1. Similarly, for cell 2, the 100 cell preference factors ($p_{2,1}$-$p_{2,100}$) would be indicative of the relative preference that advertisers located in cells 1-100 have for advertising in cell 2. As described below, these cell preference factors, p, are used in the book choice model 20 to calculate a book attractiveness score, s, for each of the competing yellow pages books in the same metropolitan area.

The book choice model 20 is a multinominal logit choice model that was developed based upon empirical research data from a sample metropolitan market. First, for each yellow pages book, k, in a metropolitan area, the book choice model 20 computes an attractiveness score, $s_{ki}$, for advertisers located in each geographic cell, i, of the metropolitan area. The attractiveness score is indicative of how desirable an advertiser located in a particular cell, i, finds a given book k having certain characteristics. The attractiveness score depends upon: (i) the preference (from the cell preference model) of advertisers in cell i to advertise in cell j; (ii) the set of cells covered by yellow pages book k; (iii) the aggregate income of all households to which the yellow pages book k is distributed; and (iv) whether the local phone exchange carrier publishes book k or not. For example, the attractiveness of a given book k to an advertiser located in cell i increases with the preference of advertisers to place advertisements in the cells covered by book k. Similarly, the attractiveness of a given book k increases with the aggregate income of households covered by book k. Further, the attractiveness of a given book k has been found to be greater if it is published by the local telephone carrier. The attractiveness score is determined according to the following attractiveness equation:

$$S_{ki} = \Sigma_{j \in B(k)} p_{ji} [1 + \beta_{PA} A_k + \beta_{PL} LEC(k,i)] + \beta_A A_k$$

where:

$p_{ji}$ is the preference factor of advertisers located in cell i to place advertisements in geographic cell j (from the cell preference model);

B(k) is the set of geographic cells to which yellow pages book k is distributed;

$A_k$ is the aggregate income of all households to which yellow pages book k is distributed (in billions of dollars); and LEC(k,i)—1 if the local telephone exchange carrier for cell i publishes book k, and 0 otherwise.

The estimated coefficients (from empirical data) used in the attractiveness equation are:

| Coefficient | Value |
| --- | --- |
| $\beta_{PA}$ | −0.0174 |
| $\beta_{PL}$ | 0.1698 |
| $\beta_A$ | 0.1080 |

As shown in FIG. 1, the input data to the attractiveness score equation are received from the cell preference model 18, the cell table 12, and the book table 14. In particular, the preference factor p is derived from the cell preference model 18. The other input data, B(k), $A_k$, and LEC(k,i) are calculated (in block 16) based upon book and cell data stored in the book table 14 database and the cell table 12 database, respectively. The output of the attractiveness equation is a set of attractiveness scores for each competing yellow pages book in the metropolitan area, wherein each attractiveness score in each set is indicative of the attractiveness of the given book k relative to each of the geographic cells i in the metropolitan area. For example, for a given metropolitan area that is subdivided into 100 geographic cells, the attractiveness equation would be used to calculate 100 attractiveness scores for each of the competing yellow pages books.

The attractiveness scores are then used in a multinominal logit choice model, which estimates the probability that an advertiser located in a given geographic cell will choose to advertise in a particular book. In other words, the book choice model 20 determines the probability $P_{ik}$ that a randomly selected advertiser located in cell i will choose to advertise in book k in light of the universe of n books in the metropolitan market. The book choice model 20 is given by:

$$P_{ik} = Pr\,ob(i\text{ chooses }k) = \exp(\theta s_{ki})/[\Sigma_{j=1,\ldots,n} \exp(\theta s_{kj}) + 1]$$

The estimated value of θ (determined from empirical data) used in the book choice model 20 is 0.7300. The denominator of the book choice model 20 reflects a total of n+1 choices (instead of n). The additional choice represents a fictitious book with zero attractiveness. Therefore, if all the books have small or negative attractiveness for advertisers in a given geographic cell, then this fictitious book, will be chosen with high probability. The fictitious book represents the option of not advertising in any book. Referring to FIG. 1, the probability factors P (derived in block 20) are used in combination with the output from the cell revenue model (block 22) to calculate the expected book revenues in block 24. The coefficients of the attractiveness equation were estimated simultaneously with the coefficient * using the procedure in the LIMDEP (Econometric software Inc.) package of econometric software for estimating multinominal logit models. The data used were the actual advertiser expenditures in each cell for yellow pages advertising in each book in the market.

The cell revenue model 22 is a nonlinear regression model that predicts the total revenue expended by all advertisers located in a metropolitan area to place yellow pages advertisements in each of the geographic cells in the metropolitan area. In other words, the cell revenue model 22 predicts the total advertising revenue potential of a particular geographic cell. The output of the cell revenue model 22 depends on the number of non-manufacturing businesses (Ni) located in cell i and the total sales, in millions of dollars, ($S_i$), of non-manufacturing businesses located in cell i. The cell revenue model 22 is given by:

$$R_i = \rho_o + \rho_N N_i + \rho_{NN} N_i^2 - \rho_{NS} N_i S_i + \rho_s S_i$$

The coefficients were estimated (from empirical data) using the LINEST regression function in EXCEL (Microsoft, Inc.), with the product and squared terms calculated prior to the estimation. The data used were the total expenditures for yellow pages advertising in each cell. The estimated values are:

| Coefficient | Value |
|---|---|
| $\rho_o$ | 328,115 |
| $\rho_N$ | 527.06 |
| $\rho_{NN}$ | 0.19223 |
| $\rho_{NS}$ | 0.10647 |
| $\rho_S$ | 292.14 |

The value $R_i$ from the cell revenue model equation is the total revenue potential of cell i. The total cell revenue potential values $R_i$ are then used with the probability factors P (from block 20 of FIG. 1) to calculate the total expected book revenue for a given yellow pages book.

The final step of the invented system comprises calculating the total expected expenditures for advertisements in a given yellow pages book. First, the expected expenditures for yellow pages advertisements in a given book k by businesses located in the given cell i are calculated according to the following equation:

$$R_{ik} = P_{ik} R_i$$

Finally, as shown in book revenues 24, the total expected revenue $BR_k$ for a given yellow pages book k derived from all advertisers in the metropolitan area is given as:

$$BR_k = \Sigma_i R_{ik} = \Sigma_i P_{ik} R_i$$

Thus, the value $BR_k$ represents the total revenue that can be expected to be derived from a particular yellow pages book having the given coverage characteristics.

The invented system can be used to produce revenue predictions in a variety of metropolitan areas wherein the specific cell and book data relating to those metropolitan areas were used as input data to the models. The invented system can be implemented in a variety of ways, for example, it can be implemented as an "add-in" tool for MapInfo™, a commercially-available geographical information system that is known to those of skill in the art.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A method of analyzing geographic advertising preferences of potential advertisers, comprising the steps of:
   determining a numeric cell preference factor; and
   displaying the cell preference factor to indicate a preference of the potential advertisers located in a first geographic area of placing advertisements in a second geographic area, the first geographic area and the second geographic area having a distance between them.

2. The method of claim 1, wherein said cell preference factor is calculated in part based on the distance between said first geographic area and said second geographic area.

3. The method of claim 1, wherein said cell preference factor is calculated in part based on an aggregate income of households located in said second geographic area.

4. The method of claim 1, wherein said cell preference factor is calculated in part based on total sales of non-manufacturing businesses located in said second geographic area.

5. The method of claim 1, wherein said cell preference factor is determined using: (i) a distance between said first geographic area and said second geographic area; (ii) an aggregate income of households located in said second geographic area; and (iii) a total sales of non-manufacturing businesses located in said second geographic area.

6. The method of claim 5 wherein said cell preference factor is calculated according to the following equation:

$$P_{ji} = \beta_o + \beta_D \ln(D) + \beta_I I + \beta_B B,$$

where $P_{ji}$ is said cell preference factor;
D is said distance between said first geographic area and said second geographic area;
I is said aggregate income of households located in said second geographic area; B is said total sales of non-manufacturing businesses located in said second geographic area; and
$\beta_O$, $\beta_D$, $\beta_I$, and $\beta_B$ are estimated constants.

7. A method of predicting advertising revenue derived from a business directory book, comprising the steps of:
   estimating a numeric geographic preference of advertisers located in a first geographic area of placing advertisements in a second geographic area;
   determining an expected amount of advertising revenue attributable to the business directory book based on said geographic preference, the first geographic area and the second geographic area having a distance between them; and
   displaying the expected amount of advertising revenue.

8. The method of claim 7, further comprising the steps of:
   determining a choice probability factor indicative of the probability that advertisers located in said first geographic area will choose to advertise in the business directory book; and
   deriving an expected total amount of advertising revenue from said first geographic area.

9. The method of claim 8, wherein said step of determining a choice probability factor includes said geographic preference.

10. The method of claim 8, further comprising the step of determining a predicted advertising revenue derived from the business directory book based on said choice probability factor and said expected total amount of advertising revenue from said first geographic area.

11. The method of claim 7, wherein said geographic preference is determined in part using the distance between said first geographic area and said second geographic area.

12. The method of claim 7, wherein said geographic preference is determined in part using an aggregate income of households located in said second geographic area.

13. The method of claim 7, wherein said geographic preference is determined in part using a total sales of non-manufacturing businesses located in said second geographic area.

14. The method of claim 7, wherein said geographic preference is determined using: (i) the distance between said first geographic area and said second geographic area; (ii) an aggregate income of households located in said second geographic area; and (iii) a total sales of non-manufacturing businesses located in said second geographic area.

15. A method of predicting advertising revenue derived from a business directory book comprising the steps of:

estimating a numeric geographic preference of advertisers located in a first geographic area of placing advertisements in a second geographic area, the first geographic area and the second geographic area having a distance between them, wherein said geographic preference is determined using:

(i) a distance between said first geographic area and said second geographic area;

(ii) an aggregate income of households located in said second geographic area; and (iii) a total sales of non-manufacturing businesses located in said second geographic area;

determining an expected amount of advertising revenue attributable to the business directory book based on said geographic preference;

determining a choice probability factor indicative of the probability that advertisers located in said first geographic area will choose to advertise in the business directory book;

deriving an expected tool amount of advertising revenue from said first geographic area; and displaying the total amount of advertising revenue.

16. The method of claim 15 further comprising the step of determining a predicted advertising revenue derived from the business directory book based on said choice probability factor and said expected total amount of advertising revenue from said first geographic area.

* * * * *